(12) United States Patent
Berlin et al.

(10) Patent No.: US 11,534,954 B2
(45) Date of Patent: Dec. 27, 2022

(54) METHOD AND DEVICE FOR BLOW MOLDING A PLASTIC TANK WITH AT LEAST ONE CONNECTION ELEMENT PENETRATING THE TANK WALL

(71) Applicant: VOLKSWAGEN AKTIENGESELLSCHAFT, Wolfsburg (DE)

(72) Inventors: Ralf Berlin, OT Wiepke / Gardelegen (DE); Claudia Mientkewitz, Ronnenberg (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 17/148,714

(22) Filed: Jan. 14, 2021

(65) Prior Publication Data
US 2021/0213669 A1    Jul. 15, 2021

(30) Foreign Application Priority Data
Jan. 16, 2020  (DE) ..................... 10 2020 200 512.5

(51) Int. Cl.
*B29C 49/60*   (2006.01)
*B29C 49/50*   (2006.01)
B29K 101/12   (2006.01)
B29L 31/00    (2006.01)

(52) U.S. Cl.
CPC .............. *B29C 49/60* (2013.01); *B29C 49/50* (2013.01); *B29C 2049/506* (2013.01); *B29C 2049/6063* (2013.01); *B29K 2101/12* (2013.01); *B29L 2031/7172* (2013.01)

(58) Field of Classification Search
CPC ......... B29C 49/60; B29C 49/50; B29C 49/04; B29C 2049/6063; B29C 2049/506; B29C 2049/6072; B29K 2101/12; B29L 2031/7172
See application file for complete search history.

(56) References Cited

U.S. PATENT DOCUMENTS

| 8,968,634 B2 | 3/2015 | Lichtenauer et al. |
| 10,005,221 B2 | 6/2018 | Dukaj |
| 2010/0255234 A1 | 10/2010 | Koetke |
| 2016/0075074 A1 | 3/2016 | Dukaj |

FOREIGN PATENT DOCUMENTS

| DE | 102007024677 A1 | 11/2008 |
| DE | 102009015964 A1 | 10/2010 |
| DE | 102009031441 A1 | 1/2011 |
| DE | 102013006594 A1 | 10/2014 |
| JP | 2008284746 A | 11/2008 |
| JP | 2014104693 A | 6/2014 |
| JP | 2017087500 A | 5/2017 |
| JP | 2017087606 A | 5/2017 |
| WO | 2010006900 A1 | 1/2010 |

*Primary Examiner* — Monica A Huson
(74) *Attorney, Agent, or Firm* — Barnes & Thornburg, LLP

(57) ABSTRACT

A method for blow molding a plastic tank from thermoplastic material, wherein the plastic tank is provided with at least one connection element penetrating the wall of the plastic tank while the plastic tank is being shaped within a blow molding tool. The connection element is fitted onto a blowing needle of the blow molding tool and is positioned in the wall by punching in the blowing needle. Also disclosed is a blow molding tool for use in the method having a blowing needle formed to fit a connection element.

8 Claims, 3 Drawing Sheets

US 11,534,954 B2

METHOD AND DEVICE FOR BLOW MOLDING A PLASTIC TANK WITH AT LEAST ONE CONNECTION ELEMENT PENETRATING THE TANK WALL

PRIORITY CLAIM

This patent application claims priority to German Patent Application No. 10 2020 200 512.5, filed 16 Jan. 2020, the disclosure of which is incorporated herein by reference in its entirety.

SUMMARY

Illustrative embodiments relate to a method and to a tool for blow molding a plastic tank, in particular, a fuel tank for a transportation vehicle.

BRIEF DESCRIPTION OF THE DRAWINGS

Disclosed embodiments will be explained below with reference to the drawings. Irrespective of actual combinations of features, the features that are shown in the figures of the drawing and/or explained below may also be general features of the disclosed embodiments.

DETAILED DESCRIPTION

Figure 1:
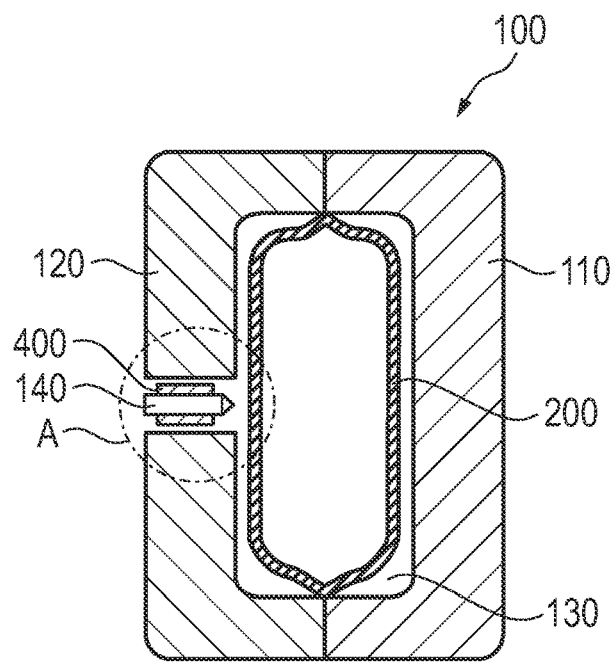
FIG. 1 shows a schematic sectional representation of an exemplary blow molding tool for producing a plastic tank.

Plastic tanks or plastic containers, such as fuel tanks for transportation vehicles, can be produced by blow molding (also referred to as hollow-body blow molding). In blow molding, a warm and soft preform of thermoplastic material is inflated with blowing air (for example, compressed air or, if appropriate, also a gas) in a blow molding tool and in the process is applied to the inner surfaces of a shaping tool cavity. The hollow body created in this way is cooled in the blow molding tool until it has sufficient strength and/or dimensional stability and can be removed from the mold. In a conventional method, a tube-like preform (parison) is used, which is created immediately beforehand by extrusion (extrusion blow molding).

Plastic tanks, in particular, fuel tanks, are usually provided with a variety of internal fittings which require lead-throughs or passages through the tank wall. To produce such passages, it is possible to introduce bores, punched clearances or the like, into which connection elements are then possibly also inserted and, if appropriate, sealed, into the tank wall of the fully molded tank.

DE 10 2007 024 677 A1 describes a method for producing a container, in particular, a fuel container, from thermoplastic material by extrusion blow molding, the container being provided with at least one connection element (3) passing through the wall of the container while it is being shaped within a multi-part tool. The connection element (3) can be formed in two parts, one part being formed as a removable cutting element (11). The cutting element (11) serves as a penetration tip for piercing the wall of the container from the inside outward in the still-plastic state. After completion, the cutting element (11) can be removed from an outwardly protruding peg (8) of the connection element (3). What is described is, however, also an embodiment of the connection element (3) in which it is provided with a cutting element (11), which is a removable casing but rather of an integral constituent part of the connection element (3).

A further method for producing a plastic tank by blow molding that has at least one connection element penetrating the tank wall is now presented by the disclosed method. Disclosed embodiments also include a blow molding tool is suitable for use in the disclosed method.

The disclosed method for blow molding a plastic tank from thermoplastic material, in particular, for blow molding a plastic fuel tank (for a transportation vehicle), wherein the plastic tank is provided with at least one connection element penetrating or passing through the wall of the plastic tank (tank wall) while it is being shaped within a blow molding tool is characterized in that the connection element is fitted onto a blowing needle of the blow molding tool or is arranged on the blowing needle and then, (together) with the blowing needle, is positioned or fastened in the wall (tank wall) of the plastic tank to be produced by punching in the blowing needle (for the purpose of inflating the plastic tank).

The blow molding tool used for producing the plastic tank thus has at least one blowing needle, which is punched into the casing (wall) of the preform or with which the casing (wall) of the preform is pierced and through which blowing air then flows into the interior of the preform to inflate the preform, as explained at the outset. Provision is then made that such a blowing needle is further also used to arrange a connection element in the wall of the plastic tank to be produced. For this purpose, the suitably formed blowing needle is punched (from the outside inward) through the casing (wall) together with the previously (i.e., before the blow molding operation) fitted connection element in such a way that the connection element is located in the opening created during the punching in or penetrating operation. After this, blowing air, in particular, compressed air, is conducted into the interior of the preform by the blowing needle. After the plastic tank has been fully inflated, the blowing needle is withdrawn (outward), the connection element remaining in the tank wall.

The blow molding tool can have a plurality of blowing needles, at least one blowing needle being formed to position a connection element in the wall of the plastic tank to be produced during the blow molding operation, as explained above. When the blow molding tool is being configured, the blowing needle concerned is arranged at the corresponding location. Since blowing needles can be arranged almost anywhere in the blow molding tool, the disclosed embodiments makes it possible to introduce connection elements almost at any desired location.

A connection element may be understood to be a tube-like or, if appropriate, also annular hollow-body component which is provided to be fastened to the tank wall such that it passes through or penetrates the tank wall, and therefore a sealed passage through the tank wall or a leadthrough through the tank wall is formed. In this respect, the connection element can also be referred to as a penetration element or passage element. Depending on the intended purpose of use, such a connection element can, for example, be used to connect a hose or a tube on the inside and/or on the outside, to pass through at least one cable or hose (through the tank wall), to arrange at least one valve or at least one switch in the tank wall, and the like. The connection element can be manufactured from metal or plastic, in particular, from a thermoplastic material. The connection element may be formed in one piece.

The blowing needle is punched from the outside inward through the casing (wall) of the preform together with the fitted connection element. This may take place in a dynamic, virtually closing movement, such that the casing does not yield and/or recede at the location concerned on account of inertia effects. (A die or the like, as described in DE 10 2007 024 677 A1, is thus not necessary.) For this purpose, the blowing needle with the fitted connection element can be moved at a speed of at least 0.50 m/s, optionally at least 0.75 m/s and, in particular, at least 1.00 m/s, during the punching in operation.

It is beneficial if what is known as a preliminary blow molding operation takes place before the blowing needle (together with the fitted connection element) is punched in. What is meant by this is that, before the blowing needle concerned is punched in, an internal pressure is already applied to the preform (this can take place, for example, using a blowing pin or, in the case of extrusion blow molding, using the extrusion head), so that the casing (wall) of the preform has an increased stability by virtue of the internal pressure.

It is beneficial if the punching in of the blowing needle with the fitted connection element takes place before the shaping (or the inflating) of the plastic tank begins or at least before the shaping (or the inflating) of the plastic tank has ended. It is provided here that the connection element may be an undercut connection geometry which is a collar, for example, the connection geometry being connected to the wall of the plastic tank form-fittingly or undercut during the subsequent further shaping of the plastic tank in the blow molding tool so that an anchoring effect is produced.

The connection element may be manufactured from a thermoplastic material, the preform and the connection element being formed from the same thermoplastic material such that the connection element can be connected to the wall of the plastic tank in a materially bonded manner.

The connection element can be heated before the punching in operation (into the casing of the preform or into the wall of the partially inflated plastic tank), in particular, after the connection element has been fitted onto the blowing needle. The heating may be carried out by the targeted application of hot air or infrared radiation, in particular, before the blow molding tool is closed. The blow molding tool can have a corresponding heating device by which the connection element can be heated before the punching in operation. The preheating of the connection element improves the temporary sealing during the punching in operation (in that the warm connection element adheres to the edge of the opening) and furthermore promotes a form-fitting connection and/or in the case of a thermoplastic connection element, a materially-bonded connection to the wall of the plastic tank.

The disclosed blow molding tool for blow molding a plastic tank, in particular, a fuel tank, has a plurality of tool parts which enclose a shaping cavity and which can carry out an opening and closing movement, wherein at least one of the tool parts is equipped at least with a blowing needle that can be displaced, i.e., can be moved into the cavity, and that is provided, for the purpose of inflating a preform located in the cavity, to be punched into it (preform) (what is known as punching in), as described above. Provision is made that the blowing needle (or at least one of the blowing needles, in the case of a plurality of blowing needles) is further also formed such that it is possible to fit a connection element, to position the connection element in the wall of the plastic tank to be produced by virtue of punching in (the blowing needle) or to fasten the connection element to the tank wall of the plastic tank to be produced such that it penetrates the tank wall, as described above.

Provision is made that the blowing needle has a retaining portion for the connection element (to be fitted) that is delimited by an axial stop, for example, a radial shoulder or the like, and also a head portion which projects beyond the fitted connection element (in the direction of the cavity), at least one blowing-air opening being located in the head portion, as explained in more detail below. The head portion of the blowing needle can be formed with at least one tip and/or with at least one cutting edge to promote the introduction of a defined opening into the preform and to avoid cracks and the like.

Figure 4:
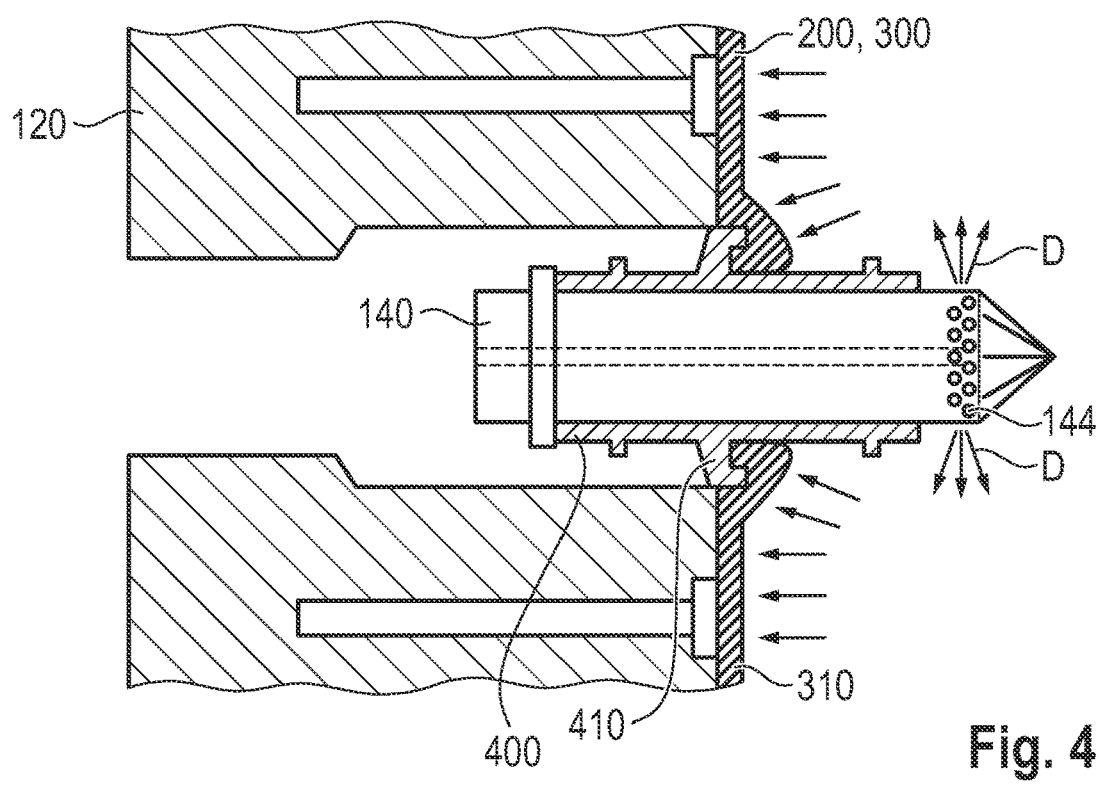
FIG. 4 illustrates a third temporal sequence in an exemplary method for blow molding a plastic tank, the plastic tank being provided with a connection element penetrating the wall of the plastic tank while the plastic tank is being shaped in the blow molding tool of FIG. 1.

The blow molding tool 100 shown in FIG. 1 has two tool parts 110, 120 which enclose a cavity 130. Located in the closed cavity 130 is a warm and soft preform 200 of thermoplastic material (the temperature amounts to, for example, about 190° C.) that is inflated by virtue of internal pressure and in the process is applied to the inner surfaces of the cavity 130 in a matching manner (as illustrated in FIG. 4). For this purpose, the blow molding tool 100 has a plurality of blowing needles 140 (of which by way of example only one is illustrated), which pierce the casing of the preform 200 when the blow molding tool 100 is closed and apply blowing air to the interior space of the preform 200 as uniformly as possible. (The blow molding tool 100 can additionally also have at least one blowing pin, not shown, which has larger dimensions than the blowing needles). According to the disclosed embodiments, at least one of the blowing needles 140 is also formed to introduce a connection element 400 penetrating the tank wall while the plastic tank to be produced is being shaped (by blow molding the preform 200). For this purpose, the connection element 400 is fitted onto the blowing needle 140 concerned and then, using the blowing needle 140, positioned or fastened in the wall of the plastic tank to be produced, as explained below.

Figure 2:
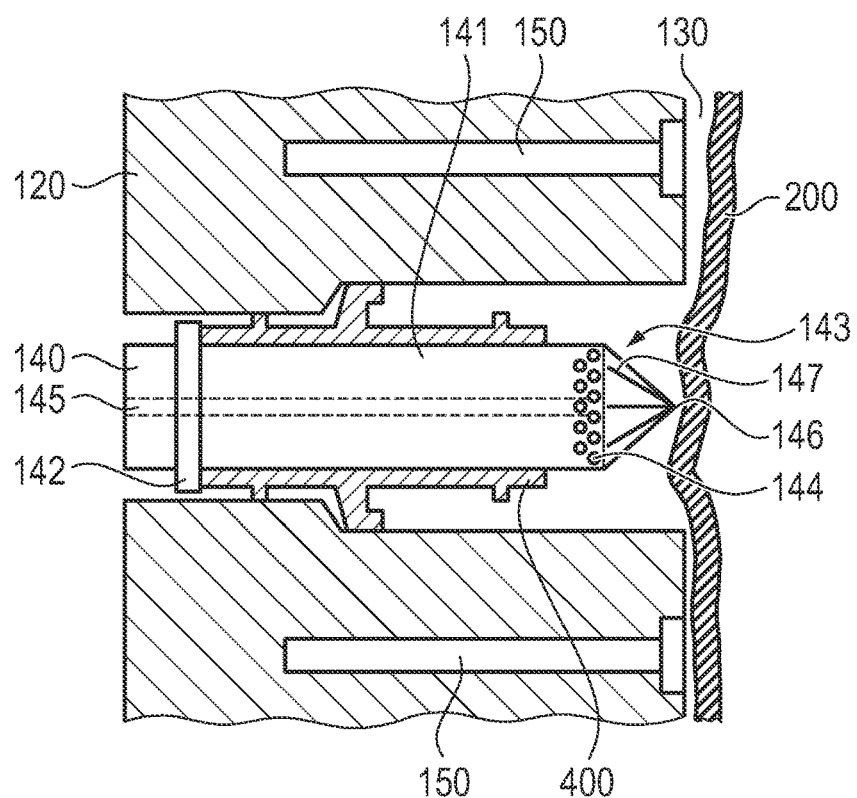
FIG. 2 illustrates a first temporal sequence in an exemplary method for blow molding a plastic tank, the plastic tank being provided with a connection element penetrating the wall of the plastic tank while the plastic tank is being shaped in the blow molding tool of FIG. 1.

FIGS. 2 to 6 show a detail of the blow molding tool 100 according to the region A labeled in FIG. 1. FIG. 2 shows the blowing needle 140, which can be displaced axially in its longitudinal direction, with the casing-like connection element 400 fitted thereto, before being punched into the preliminarily blow molded preform 200. The blowing needle 140 has a retaining portion 141 with an axial stop 142 and also a head portion 143, which projects beyond the fitted connection element 400 in the direction of the cavity 130. A plurality of annularly arranged blowing-air openings 144, which are supplied by a blowing-air bore 145, are located in the head portion 143. The head portion 143 is further formed with a tip 146 and also a plurality of cutting edges 147.

Figure 3:
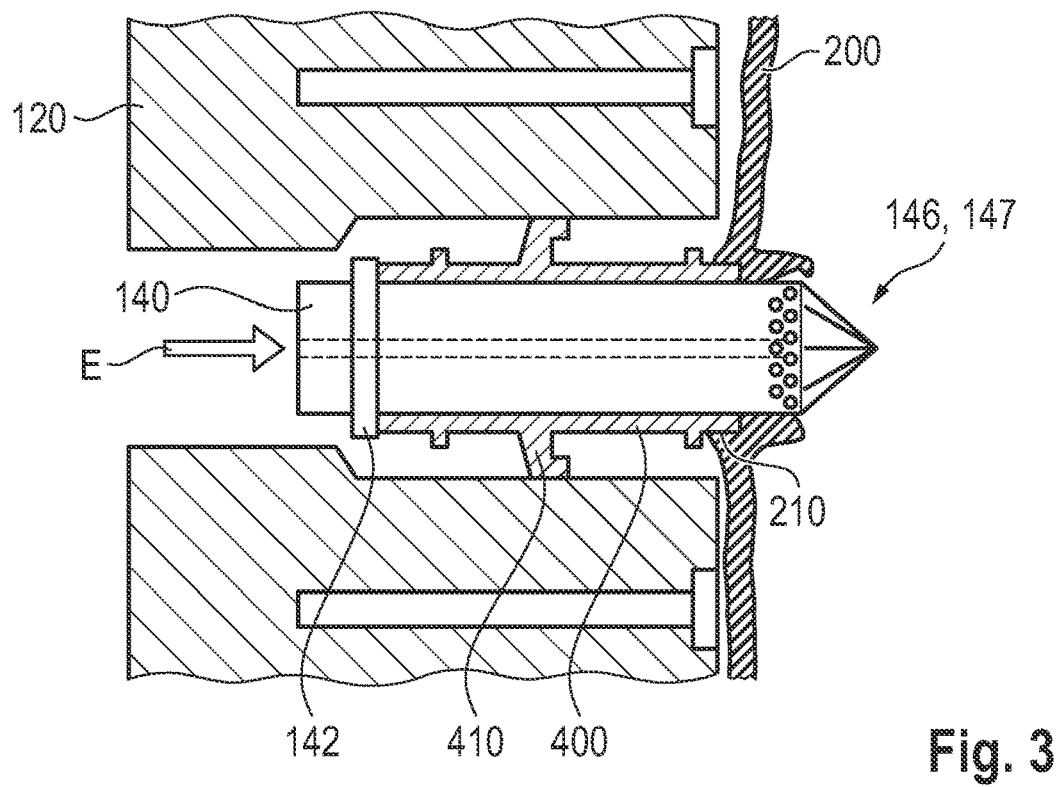
FIG. 3 illustrates a second temporal sequence in an exemplary method for blow molding a plastic tank, the plastic tank being provided with a connection element penetrating the wall of the plastic tank while the plastic tank is being shaped in the blow molding tool of FIG. 1.

By using a drive, not shown (the drive occurs pneumatically, for example), the blowing needle 140 is moved together with the fitted connection element 400, optionally after the connection element has been heated (as described above), dynamically from the outside inward out of the starting position shown in FIG. 2 into the cavity 130 and in the process is punched through the casing of the preform 200, as shown in FIG. 3. The operation, also referred to as punching in, is indicated by the arrow E in FIG. 3. In this respect, the stop 142 transmits the retracting movement of the blowing needle 140 to the connection element 400 and presses the connection element into the opening (aperture opening) 210 created using the tip 146 and the cutting edges 147 during the punching in operation E, until the axial end position shown in FIG. 4 is reached. The connection element 400 is, as it were, automatically concomitantly moved forward and introduced into the opening 210 or positioned in the opening 210 during the punching in operation E. After this, blowing air is conducted into the interior of the preform 200 by the blowing needle 140, as indicated by the arrows D in FIG. 4, as a result of which the preform 200 is inflated and shaped to form a plastic tank 300. The tool configuration that is matched to the connection element 400 to be positioned prevents uncontrolled deformation, in particular, bulging, of the thermoplastic material at the opening 210.

The connection element 400 has a collar-like connection geometry 410, which promotes a temporary sealing action when the connection element 400 is being punched in and is then connected to the tank wall 310 form-fittingly or undercut during the blow molding of the plastic tank 300, as a result of which on the one hand a reliable seal is achieved between the connection element 400 and the tank wall 310 (the form fit can act as an additional barrier) and on the other hand also a stable anchoring of the connection element 400 in the tank wall 310 is obtained. Later, the anchoring makes it possible to support bending forces and torques. The thermoplastic material which is displaced inward when the blowing needle 140 is being punched in E (see FIG. 3) leads to a local accumulation of material at the inner edge of the opening, which afterward promotes the sealing and anchoring by virtue of bead-like deformation.

Figure 5:
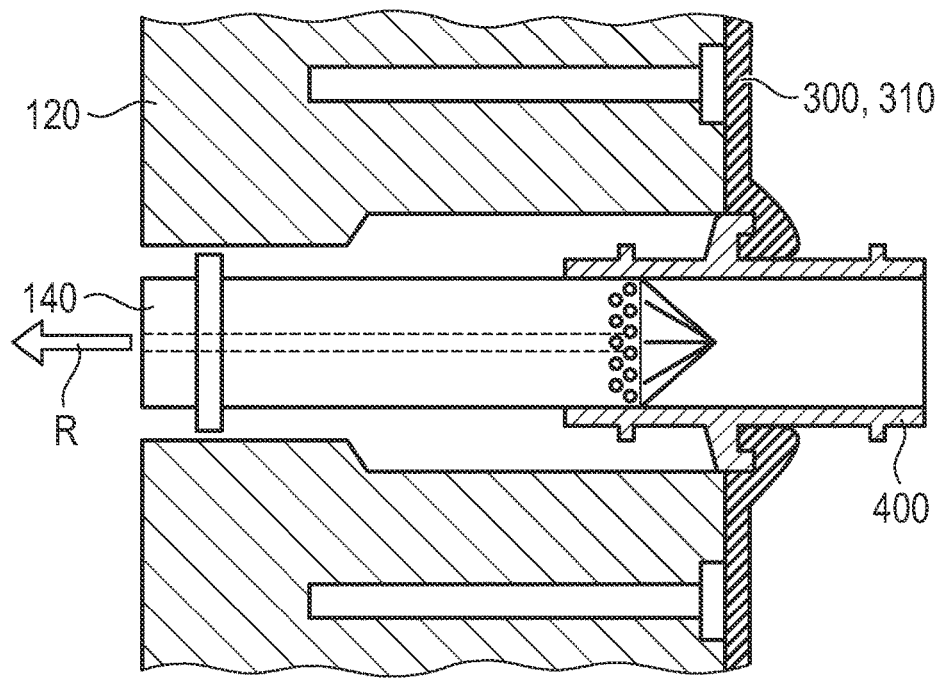
FIG. 5 illustrates a fourth temporal sequence in an exemplary method for blow molding a plastic tank, the plastic tank being provided with a connection element penetrating the wall of the plastic tank while the plastic tank is being shaped in the blow molding tool of FIG. 1.
Figure 6:
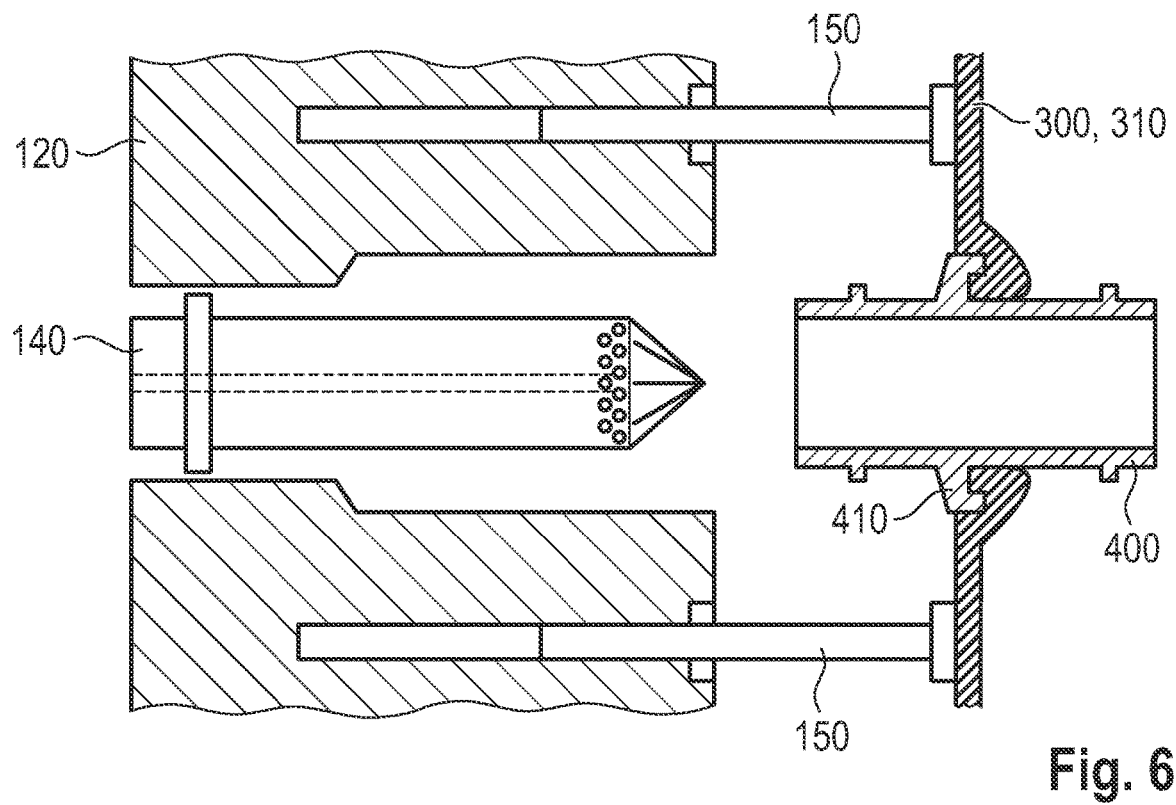
FIG. 6 illustrates a fifth temporal sequence in an exemplary method for blow molding a plastic tank, the plastic tank being provided with a connection element penetrating the wall of the plastic tank while the plastic tank is being shaped in the blow molding tool of FIG. 1.

After the plastic tank 300 has been fully inflated, the blowing needle 140 is withdrawn outward into the starting position (reset), as indicated by the arrow R in FIG. 5, the connection element 400 remaining in the tank wall 310 such that it penetrates the latter. The blowing needle 140 can be provided with a polished surface or a non-stick coating to facilitate the withdrawal from the connection element 400. After the plastic tank 300 has cooled and/or solidified and the blow molding tool 100 has been opened (by moving the tool parts 110, 120 apart), the plastic tank 300 can be removed from the mold using ejectors 150. Then, a further manufacturing cycle can begin. The method described can be automated very readily, for example, using a robot.

LIST OF REFERENCE SIGNS

100 Blow molding tool
110 Tool part (mold half)
120 Tool part (mold half)
130 Cavity
140 Blowing needle
141 Retaining portion
142 Stop
143 Head portion
144 Blowing-air opening(s)
145 Blowing-air bore
146 Tip
147 Cutting edge(s)
150 Ejector
200 Preform (casing)
210 Opening
300 Plastic tank
310 Tank wall
400 Connection element
410 Connection geometry
A Region
D Blowing air
E Punching in (punching in operation)
R Reset

The invention claimed is:

1. A blow molding tool for blow molding a plastic tank comprising:
    a plurality of tool parts enclosing a shaping cavity,
    wherein at least one of the plurality of tool parts includes at least one displaceable blowing needle, which is punched into a preform for the purpose of inflating the preform located in the cavity,
    wherein the blowing needle fits a connection element to position the connection element in the wall of the plastic tank to be produced by punching in the blowing needle, and
    wherein the blow molding tool further comprises a retaining portion for the connection element that is delimited by an axial stop and a head portion which projects beyond the fitted connection element and in which at least one blowing-air opening is located.

2. The blow molding tool of claim 1, wherein the head portion of the blowing needle comprises at least one tip and/or at least one cutting edge.

3. The blow molding tool of claim 1, further comprising a heating device by which the connection element is heated before the punching in operation.

4. A method for blow molding a plastic tank from thermoplastic material, wherein the plastic tank includes at least one connection element penetrating the wall of the plastic tank while the plastic tank is being shaped within a blow molding tool, the method comprising:
    fitting the connection element onto a blowing needle of the blow molding tool; and
    positioning the connection element in the wall by punching in the blowing needle,
    wherein the blowing needle with the fitted connection element is moved at a speed of at least 0.50 m/s during the punching in operation.

5. The method of claim 4, wherein a preliminary blow molding operation takes place before the blowing needle is punched in.

6. The method of claim 4, wherein the punching in of the blowing needle with the fitted connection element occurs before the shaping of the plastic tank begins or has ended, wherein the connection element is snugly connected to the wall during the shaping of the plastic tank.

7. The method of claim 4, wherein the connection element is manufactured from a thermoplastic material and is materially bonded to the wall.

8. The method of claim 4, wherein the connection element is heated before the punching in operation.

* * * * *